July 31, 1951  H. W. JURY ET AL  2,562,864

RADIANT ENERGY DETECTOR

Filed Nov. 23, 1945

WITNESSES:
*William S. Klein*
*Marjorie J. Campbell*

INVENTORS
*Harold W. Jury*
*Harry R. Lubcke*

Patented July 31, 1951

2,562,864

UNITED STATES PATENT OFFICE 2,562,864

RADIANT ENERGY DETECTOR

Harold W. Jury, Burbank, and Harry R. Lubcke, Hollywood, Calif., assignors to Thomas S. Lee Enterprises, Inc., Los Angeles, Calif., a corporation of California Application November 23, 1945, Serial No. 630,532

9 Claims. (Cl. 250—83)

1

This invention relates to radiant energy detectors, particularly those for delivering an electrical response from incident heat energy.

An object of this invention is to improve the sensitivity of a device of this class.

Another object of this invention is to reduce the spurious response caused by vibration of this class of detector.

Still another object is to reduce the size and weight of this class of detector.

Still another object of this invention is to simplify the construction of this class of detector.

Still another object of this invention is to facilitate the repair of this class of detector.

A final object of this invention is to reduce the electrical energy required for operating this class of detector.

The ways in which these objectives are obtained are shown in connection with the accompanying drawing in which.

This detector will respond to radiant energy of wave lengths from the visual to the very fare infrared. It is of particular value between the wave lengths of 0.8 and 15 microns. It is particularly useful in discerning the presence of objects of a very small temperature differential with respect to the background such as a ship against the sea or sky or a factory against the earth or sky.

The detector is essentially a miniature heat engine, employing a confined gaseous working substance. Opto-electrical means are employed to discern motion of the heat engine caused by impingement of radiant energy.

Figure 1:
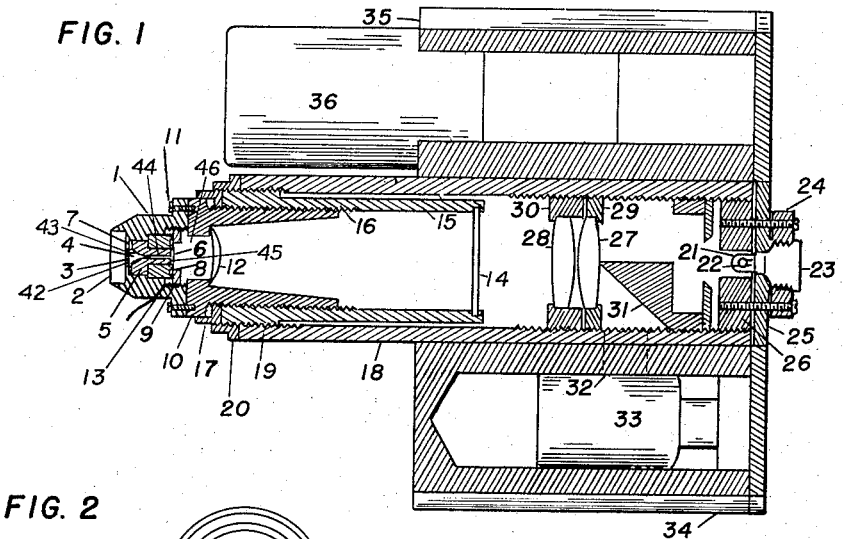
Fig. 1 shows a sectional and longitudinal view of a typical construction of this detector, taken along plane N—O in Fig. 2.
Figure 2:
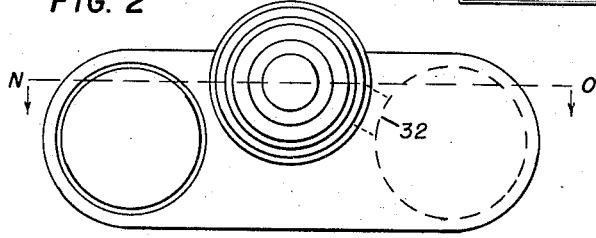
Fig. 2 shows a front elevation view of the same.

In Fig. 1, numeral I identifies the head which encloses the heat engine. A polished slab of material 2 permeable to radiant heat energy, such as rock salt or potassium bromide is sealed in the front. This allows the radiant energy to reach the working portion of the engine while still enclosing the working substance. A thin collodion film 3 of the order of 100 angstrom units in thickness, vacuum coated with a very thin deposit of metal such as aluminum, absorbs the incident radiant energy and is consequently elevated in temperature. The gaseous working substance 4 immediately adjacent thereto is also heated, consequently expands and travels as an acoustic pressure wave down the tubular orifice in plug 5. Upon arriving at the end thereof, it impinges upon another thin collodion film 6 vacuum coated with a thin deposit of metal such as antimony. This film distends, the magnitude thereof being measured by an opto-electrical system to be described.

Film 3 is formed upon carrier 7 and film 6 upon carrier 8 for convenience in manufacture and assembly. Threaded ring 9 clamps parts 5, 7, and 8 within the head I.

Holder 10 is fastened to head I by means of screws II. The joint between the holder and head is lapped in order to be vacuum tight. The main function of the holder is to support a meniscus lens 12 rigidly with respect to the film 6. Lens 12 is sealed into the holder with an appropriate hard sealing-wax to the end that the series of chambers 42 to 46 inclusive extending from behind the window 2 to lens 12 are sealed with respect to the outside atmosphere. Tube 13 allows the pressure of the working substance to be adjusted after which it is pinched off and soldered tight. The several elements recited are carefully machined. However, the fits between elements 5, 8, and I are a few ten thousandths of an inch loose, so that the pressure of the working substance equalizes within the resulting chambers within a period of a few minutes.

Turning now to the optical system which discerns the motion of the film 6 a parallel lined grid 14 is supported in the grid barrel 15. The latter is adjustably mounted on threads 16 on holder 10. Locking ring 17 allows any given adjustment to be retained. In turn, the cylindrical body 18 is adjustably connected to grid barrel 15 by means of threads 19 and is locked by ring 20.

In the rear of the body 18 an electric lamp 21 having a small filament 22 and base 23 is mounted in insulated socket 24. Closure piece 25 and threaded cylinder 26 support the socket within the body 18. Rays of light from the filament 22 are brought to a focus on film 6 by condensing lenses 27 and 28 positioned respectively in threaded holders 29 and 30. The rays pass through the transparent spaces in grid 14 through meniscus lens 12 and are reflected by the mirror-like surface of film 6. On the return path the rays again pass through lens 12. The relation between the distances between elements 14, 12, and 6 is adjustble so that an image of the opaque portions of the grid 14 can be focused in the plane of the grid 14. A slight nonaxiality of lens 12 causes the image of the opaque portions of grid 14 to fall upon the spaces between the opaque lines. When the film 6 is in the normal position a very small amount of light passes through the plane of the grid 14 on the return path. When the film 6 distends the focal length of the system is increased, changing the magnification, and consequently the overlap pattern, thus allowing a greater amount of light to pass through grid 14. It is found that the amount of light passing through grid 14 is substantially linear with respect to the distention of film 6 over a range considerably greater than that caused by useful amounts of incident radiant energy.

The thus modulated light rays return through the condensing lenses 28 and 27 and are reflected by a 45° mirror 31 through hole 32 in the body 18 to photocell 33. The latter is contained in auxiliary cylindrical cavity 34.

A second auxiliary cavity 35 contains an electronic amplifier. This contains vacuum tube 36 and associated components shown schematically in Figures 3 or 4.

It is understandable that many gaseous substances might be chosen for the working substance and that an optimum pressure of the particular substance might exist. Not only is this choice influenced by thermo-dynamic considerations, but also by kinetic considerations. It will be understood that the films 3 and 6 can be distended by effect of inertia of the working substance when the detector as a whole is given an acceleration under conditions of vibration. We have found that air at a pressure of 8 cm. of mercury gives the greatest useful response in this type of detector. The response caused by a heat impulse is a maximum with respect to that caused by the acceleration of the detector. We have found further that the optimum pressure varies in accordance with the length of the tubular chamber in plug 5. In the detector shown this chamber is conveniently 0.3 of an inch long. When this chamber was increased to four inches in length in another embodiment, the optimum pressure increased from 8 to 10 cm. of mercury. Air has a large ratio of heat capacity to mass.

The prior art, in attempting to reduce the spurious response caused by the inertia of the working substance has resorted to auxiliary chambers designed to position the center of gravity of the working substance at film 6. An essential part of such practice was a necessity for confining the working substance in a small chamber immediately adjacent to the right hand side of film 6. This created a high pneumatic impedance into which the distention of film 6 had to occur. In our embodiment the film 6 works into a low pneumatic impedance formed by the large volume between film 6 and meniscus lens 12. We find that the large volume should be of the order of twenty times the volume of the enclosed working substance. This accomplished an increase in signal response two and one-half times over the prior art.

The parallel lined grid 14 is composed of the order of 200 lines to the inch. It is apparent that minute displacements of the elements of the optical system will give rise to spurious responses. The prior art utilized cantilever members positioned transversely to a common base plate or similarly disposed members between two parallel plates. It was found that a reasonable pressure exerted by the finger was sufficient to cause a spurios response.

In our embodiment the cylindrical body 18 is of comparatively great rigidity. For a body of given size and weight this form provides the greatest rigidity. In addition, extraneous light, particles of dust and other foreign influences are prevented from affecting the performance of the optical system.

In our embodiment we have evolved electronic circuits which give a maximum signal to noise ratio with a minimum amount of unmodulated light. This makes possible the use of a relatively very small electric lamp 21. This requires only a small amount of electrical energy for lighting the filament 22 to incandescence, resulting in a relatively large saving of electrical energy and almost total absence of heat in the detector. It will be realized that a reduction of electrical power dissipation of 30 times to a final value of one-half watt reduces the possibility of spurious effects because of heat to a negligible value.

Of even greater importance is the opportunity to utilize a light source having extremely small dimensions. This causes the optical system to approach the theoretically desirable point source of illumination in which the penumbra effect through the grid 14 is reduced to a small value and the umbra is relatively sharp. This objective is conveniently achieved with a light source having a width commensurate to the width of the opaque lines of the grid and aligned parallel therewith. Since the grid lines lie parallel one to the other, an appreciable dimension of the light source in the direction of the lines is immaterial and does not cause the source to functionally depart from its point-like nature.

The prior art utilized parallel lined grids having equal width of opaque lines and transparent spaces. We have found that a parallel lined grid 14 gives greatest useful output when the opaque lines occupy 70% of the total area. This, of course, results in a residuum of 30% transparent area. The greater useful output arises from the fact that the opaque lines of practical grids are not completely opaque. In the normal range of operation, the 20% or more of the grid is increased in opacity because of the overlap of the black image upon the original opaque lines.

In the prior art the films 3 and 6 were invariably contained between radiant energy permeable and visual light permeable members which were sealed within the head 1. Such practice usually resulted in a single film 3 and a single film 6 being inserted and the unit put into operation.

In our embodiment by means of the plug 5 and the clamping ring 9 it is possible to replace both films by merely unfastening the head 1 from the holder 10, unscrewing the ring 9, and removing the films and carriers 6 and 8 and 3 and 7, respectively. We have found that although due care is taken in processing these films optimum results in any given detector are obtained by experimentally matching the films one to the other and to the chamber. In our embodiment it is consequently feasible to carry out this process in a comparatively short time and also to repair the detector rapidly in case the films should be damaged in use.

Figure 3:
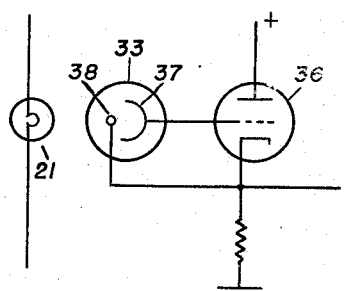
Fig. 3 shows a diagram of an open-grid type electrical circuit which forms a part of the detector.

Passing now to Fig. 3, we have found that connecting a photo-emissive photocell 33 directly to the grid of the first amplifying vacuum tube 36 results in the signal to noise ratio greater than any of the methods of the prior art. The contact potential of the grid of the vacuum tube places a slight negative potential on the photo-cathode 37 whereby photo-electrons emitted therefrom pass to the anode 38 and thereby complete the circuit to the cathode of vacuum tube 36. The grid of the vacuum tube has a very high resistance to the ground under the condition of minimum illumination of the photocell. The impingement of light thereon reduces this resistance with a corresponding redistribution of electrons between the anode-cathode of the photocell and the grid-cathode of the vacuum tube.

Figure 4:
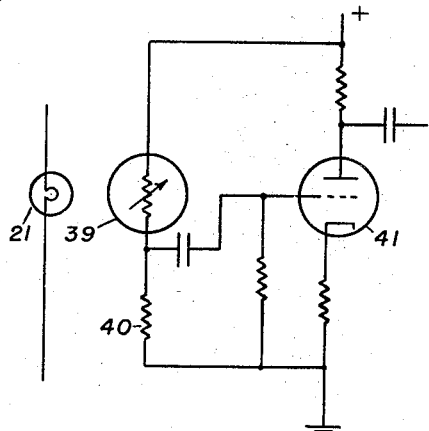
Fig. 4 shows an alternate circuit employing a photo-resistive photocell.

In Fig. 4, a photo-resistive photocell 39 replaces the photo-emissive photocell in Fig. 3. The former may be a thalofide type. This cell is supplied with a well-filtered positive potential and a variation of the voltage drop across the cell with respect to that across the resistor 40 in series therewith to ground is applied to the grid of vacuum tube 41. We have found that the greatest response is obtained with a circuit when the value of the resistor 40 is equal to one-half of the dark resistance of the thalofide cell. This is so that in operation in our detector the minimum illumination which impinges upon the cell reduces its resistance to the value of the resistor 40 making the two equal.

Having thus fully described our invention, we claim:

1. A radiant energy detector comprising; co-acting pneumatic and optical systems, said pneumatic system comprised of a thin radiant energy receptor film, a thin optically reflecting film, a chamber therebetween, another chamber adjacent to said reflecting film, the latter chamber having several times the volume of the former chamber, a gaseous working substance within said chambers, said substance being air at a pressure of approximately eight centimeters of mercury, said optical system adapted to reproduce movement of said reflecting film as a change in illumination.

2. A radiant energy detector comprising; co-acting pneumatic and optical systems, said pneumatic system including a thin mirror-like diaphragm, said optical system composed, in order of a narrow source of light, a condensing lens, a parallel lined grid having wider opaque lines than the transparent spaces therebetween, a converging lens, said mirror-like diaphragm adapted to reflect light incident thereon back through said system and means for directing light which has passed through the grid twice into a light intensity discerning means.

3. A radiant energy detector comprising; co-acting pneumatic, optical, and electrical systems, said pneumatic system including a thin mirror-like distensible diaphragm, said optical system composed, in order of a small, narrow source of light, a condensing lens system, a parallel lined grid having 70% opaque lines and 30% transparent spaces therebetween, a positive lens, said mirror-like distensible diaphragm adapted to reflect light incident thereon back through said system and means for directing light which has passed through the grid twice into a photocell.

4. A radiant energy detector comprising; co-acting rigidly connected pneumatic, optical, and electrical systems, said pneumatic system adapted to convert radiant energy into distension of a distensible mirror, said optical system comprised of a small light source, a parallel lined grid, a converging lens and said distensible mirror all aligned to pass a small amount of light with the mirror in the non-distended position, a photocell, means for directing said light thereinto, said electrical system comprised of a photo-emissive photocell having two electrodes, a vacuum tube having two input electrodes, said photocell electrodes directly connected to said vacuum tube electrodes, said small amount of light impinging upon said photocell resulting in a large value of electrical impedance between the electrodes of said photocell.

5. A radiant energy detector comprising; co-acting rigidly connected pneumatic, optical, and electrical systems, said pneumatic system adapted to convert radiant energy into distension of a distensible mirror, said optical system comprised of a small linear light source, a parallel lined grid, a converging lens and said distensible mirror all aligned to pass a small amount of light with the mirror in the non-distended position, a photocell, means for directing said light thereinto, said electric system comprised of a photo-conductive photocell and a resistor in series across a source of voltage, the resistance value of said resistor being approximately equal to the resistance of said photocell upon the impingement of said small amount of light, the major dimension of said light source being parallel to the opaque areas of said grid.

6. A radiant energy detector comprising; co-acting pneumatic and optical systems, said pneumatic system consisting of an outer member, a radiant energy permeable member, a shallow chamber closely therebehind, a thin radiation-absorbing film closely therebehind, an annular shaped carrier for said absorbing film closely therebehind, a plug member therebehind having a deep chamber coaxial with respect to the aforementioned chamber, an annular carrier member closely behind said plug member, a thin reflecting film attached to the rear of said carrier, and a locking ring bearing upon the last said carrier and threaded into said outer member, said optical system adapted to reproduce movement of said reflecting film as a change in illumination.

7. A radiant energy detector comprising; co-acting pneumatic and optical systems, said pneumatic system consisting of an outer member, a radiant energy permeable member, a shallow chamber closely therebehind, a thin radiation-absorbing film closely therebehind, an annular shaped carrier for said absorbing film closely therebehind, a plug member therebehind having a deep chamber coaxial with respect to the aforementioned chamber, an annular carrier member closely behind said plug member, a thin reflecting film attached to the rear of said carrier, and a locking ring bearing upon the last said carrier and threaded into said outer member; said optical system consisting of a linear light source of small dimensions, a condensing lens, a grid having cyclically repeated opaque and transparent areas, a positive lens, the above mentioned thin reflecting film positioned to reflect the light back through the grid and means positioned to direct said light which has passed through said grid twice, at right angles to the major optical axis, the major dimension of said light source being parallel to the opaque areas of said grid.

8. A radiant energy detector comprising; co-acting pneumatic, optical, and electrical systems, said pneumatic system consisting of an outer member, a radiant energy permeable member, a shallow chamber closely therebehind, a thin radiation-absorbing film closely therebehind, an annular shaped carrier for said absorbing film closely therebehind, a plug member therebehind having a deep chamber coaxial with respect to the aforementioned chamber, an annular carrier member closely behind said plug member, a thin reflecting film attached to the rear of said carrier, and a locking ring bearing upon the last said carrier and threaded into said outer member; said optical system consisting of a linear light source of small dimensions, a condensing lens, a grid having cyclically repeated opaque and transparent areas, a positive lens, the above mentioned thin reflecting film positioned to reflect the light back through the grid and a mirror positioned to reflect said light which has passed through said grid twice at right angles to the major optical axis; said electrical system consisting of a photocell positioned to intercept said aforementioned light off the optical axis, two electrodes in said photocell, an amplifier having a vacuum tube with two input electrodes the electrodes of the photocell being conductively connected to the input electrodes of the vacuum tube, the major dimension of said light source being parallel to the opaque areas of said grid.

9. A radiant energy detector comprising; coacting pneumatic, optical, and electrical systems, said pneumatic system consisting of an outer member, a radiant energy permeable member, a shallow chamber closely therebehind, a thin radiation-absorbing film closely therebehind, an annular shaped carrier for said absorbing film closely therebehind, a plug member therebehind having a deep chamber coaxial with respect to the aforementioned chamber, an annular carrier member closely behind said plug member, a thin reflecting film attached to the rear of said carrier, and a locking ring bearing upon the last said carrier and threaded into said outer member; said optical system consisting of a linear light source of small dimensions, a condensing lens, a grid having cyclically repeated opaque and transparent areas, a positive lens, the above mentioned thin reflecting film positioned to reflect the light back through the grid and a mirror positioned to reflect said light which has passed through said grid twice at right angles to the major optical axis; said electrical system consisting of a photocell positioned to intercept said aforementioned light off the optical axis, two electrodes in said photocell, an amplifier having a vacuum tube with two input electrodes, the electrodes of the photocell being directly connected to the input electrodes of the vacuum tube; all of said systems being rigidly contained within rigidly connected cylindrical-like bodies, the major dimension of said light source being parallel to the opaque areas of said grid.

HAROLD W. JURY.
HARRY R. LUBCKE.

REFERENCES CITED

The following references are of record in the file of this patent:

UNITED STATES PATENTS

| Number | Name | Date |
| --- | --- | --- |
| 1,862,622 | Hoffman | June 14, 1932 |
| 2,022,117 | Lauritsen | Nov. 26, 1935 |
| 2,035,906 | McMaster et al. | Mar. 31, 1936 |
| 2,177,133 | Desch | Oct. 24, 1939 |
| 2,217,446 | Ludwig | Oct. 8, 1940 |
| 2,401,191 | Rosett | May 28, 1946 |
| 2,424,976 | Golay et al. | Aug. 5, 1947 |

OTHER REFERENCES

Cioffi: Bell Labts. Record, Feb. 1927, pp. 201–204.